Sept. 3, 1957 H. C. UNKAUF 2,805,159
METHODS FOR THE PRODUCTION OF DIAZOTYPE PHOTOPRINTING MATERIALS
Filed March 2, 1953
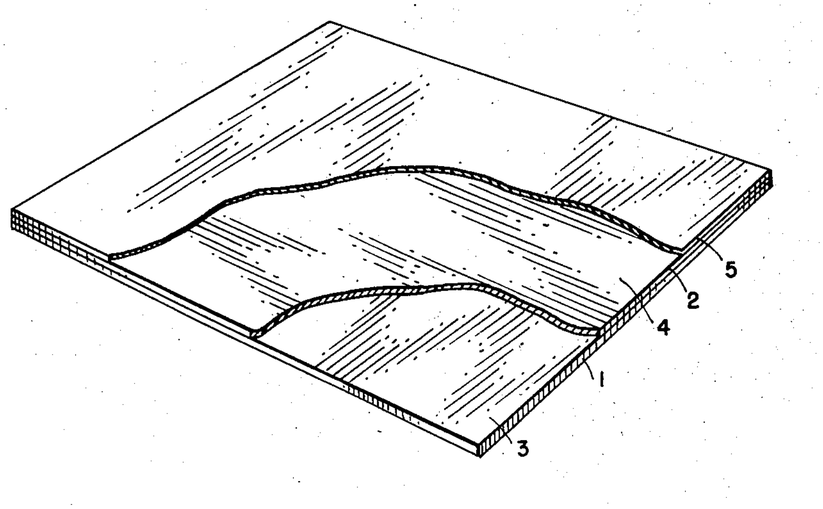
INVENTOR:–
HENRY C. UNKAUF
BY:–
Spencer, Johnston, Cook & Root
ATT'YS United States Patent Office 2,805,159

Patented Sept. 3, 1957

2,805,159

METHODS FOR THE PRODUCTION OF DIAZOTYPE PHOTOPRINTING MATERIALS

Henry C. Unkauf, Chicago, Ill., assignor to Eugene Dietzgen Co., Chicago, Ill., a corporation of Delaware Application March 2, 1953, Serial No. 339,615

9 Claims. (Cl. 96—75)

This invention relates to compositions and methods for the production of new diazotype photoprinting materials, and particularly to a coating composition and materials prepared employing the coating composition.

Diazotype photoprinting materials commonly include a light-sensitive layer in or on the surface of a suitable carrier or base, and containing a light-sensitive diazo compound, which can be partly or completely destroyed or rendered incapable of coupling with an azo coupling component upon exposure to light. Exposure of such a layer to light of locally varied intensity in accordance with an original pattern or design to be reproduced (e. g. by exposure to light under a photographic transparency, line drawing, or the like) yields an image which can be developed with an azo coupling component to form a positive copy of the original. In two-component layers, an azo coupling component is generally incorporated with the light-sensitive diazo compound, together with stabilizers to prevent coupling prior to development, and the image is developed by treatment with an alkaline vapor, such as ammonia. In the case of one-component layers which contain only a stabilized light-sensitive diazo compound without a coupling component, the latter may be applied in a developer solution.

Diazotype sensitizing compositions are usually applied in the form of an aqueous solution to a suitable carrier or base susceptible to impregation with such solutions. When an absorptive base such as paper is used, it is desirable to impregnate principally the surface portions thereof with the light-sensitive composition, since surplus sensitizing materials penetrating into the body of the paper or other absorbent base not only fail to receive sufficient illumination during exposure to contribute substantially to the formation of an image, but in addition, they tend to cause discoloration of the background portions of the resulting copy. On the other hand, when such carriers are treated to prevent substantial penetration of the sensitizing solution, as by preliminary impregnation or sizing with organic materials, e. g. of resinous nature, the relatively high concentration of organic material remaining on the surface of the base tends to form a scum yielding discolored backgrounds and causing uneven distribution of the light-sensitive components which interferes with proper rendition of the contrasts of the original to be reproduced. Moreover, high concentrations of organic sizes or impregnating materials often accelerate darkening of the print when subjected to the light and heat employed for exposure of the sensitized material.

It has also been proposed to use inorganic materials, such as bentonite or colloidal silica solutions, as precoats to prevent substantial penetration of the sensitizing component into the body of the paper sheet. However, paper precoated with bentonite is relatively opaque to ultraviolet light, and paper precoated with colloidal silica, while giving an improved image with blueprint papers, yet has many inherent disadvantages when its use is attempted in connection with the sensitizing of direct process papers. These disadvantages include agglomeration of the silica particles on the sheet during the precoating operation, causing uneven absorption of the sensitizing solution, so that the prints obtained are mottled and streaked; and excessive chalking of the precoat at the concentrations required to produce maximum opacity, causing silica dust to deposit on the printing apparatus and nearby equipment, and giving rise to a health hazard when operators are exposed to this abrasive dust over long periods of time.

It has now been discovered that the foregoing disadvantages can be overcome and new diazotype photoprinting materials from which superior prints are obtained can be produced by coating a suitable base or carrier with a new composition comprising a dispersion of silica and of a polymeric resin. After coating with the foregoing dispersion, a diazotype sensitizing composition is also applied to the base.

The figure of the accompanying drawing, illustrating a preferred embodiment of the invention, is a broken perspective view of a diazotype photoprinting material. The photoprinting material includes a sheet of paper 1 having a silica-resin coat 2 on one surface 3 of the paper. On the outer surface 4 of the coat 2 is a light-sensitive layer or coat 5 of a diazotype sensitizing composition.

The new coating composition is preferably an aqueous dispersion containing about 1 to 10% by weight of colloidal silica and about 1 to 10% by weight of colloidal polymeric resin. These proportions are particularly applicable to the coating of paper stock, and in other applications, variation may be necessary or desirable.

Aqueous colloidal silica dispersion may be prepared in known manner from a silica powder, and the dispersion may contain an agent to stabilize the colloidal suspension. Also, one of the various commercially available preparations of aqueous colloidal silica may be employed. The particle size of the colloidal silica is advantageously about 0.5–5 microns, very good results being obtained when the particle size is about 2 microns.

An aqueous colloidal polymeric resin dispersion may be prepared by emulsifying in known manner one of the polymeric resins which is suitable for paper coating applications, i. e., which will become bonded or fixed to paper. The resins are preferably colorless, film-forming, substantially water-insoluble, linear, polymeric, thermoplastic resins. Ordinarily, about one or two percent of emulsifier is employed to aid in forming a stable emulsion of resin particles the size of which is about 0.1 micron or less. Alternatively, a commercially available resin emulsion may be used, and an emulsion containing more than one resin can be employed.

The resins employed are high molecular weight polymers and include resins of the vinyl type, such as polystyrenes and their derivatives, polyacrylic resins, and polyvinyl resins. The preferred polymeric resins are those addition polymers derived from styrene, including polystyrenes and ring and side chain substituted polystyrenes. Preferred substituted polymers are, for example, halo, alkyl, and aryl substituted polystyrenes such as the polymers prepared from vinyl toluene, diphenylene, ethylene, stilbene, $\alpha$ and $\beta$-chloro and bromo styrene, $\alpha$ and $\beta$-methyl and ethyl styrene, and similar derivatives of styrene. Other suitable polymers are prepared from acrylic esters such as methyl and ethyl methacrylate, vinyl esters such as vinyl acetate, and vinyl halides such as vinyl chloride. The useful resins include homopolymers and copolymers.

Examples of suitable commercial resin emulsions are the polystyrene emulsions sold under the names Koppers Polystyrene Emulsion M, Koppers Polystyrene Emulsion R, and Dow Polystyrene Emulsions. Polyacrylic ester resin emulsions such as Rhoplex WN80, emulsified polyethylmethacrylate, are useful, as are polyvinyl resin emulsions such as Rhoplex WN75, emulsified polyvinyl acetate. The Koppers Emulsions M and R are white and contain high molecular weight polystyrene in the form of emulsified particles about 0.1 micron in diameter, the relative viscosity of the polymers in 1% solution in toluene being about 3.5–6, the latex pH being about 6.8–7.5, and the respective latex viscosities (cps.) being about 15–18 and 30–35. About 2% and 1%, respectively, of emulsifier is present. These emulsions as sold contain about 40–45% solids, a maximum of 0.5% of the solids being styrene monomer, have specific gravities of about 1.02 at 30° C., and are infinitely dilutable with water.

In preparing the new coating composition, relatively concentrated aqueous colloidal silica and colloidal polymeric resin dispersions are intimately mixed and diluted with water to produce the concentrations desired. The resulting composition contains about 1 to 10%, preferably about 2 to 5%, by weight of colloidal silica and about 1 to 10%, preferably about 3 to 5%, by weight of colloidal polymeric resin. The silica and the resin are also preferably present in approximately equal parts by weight, i. e., so that their proportions are preferably from about 3:2 to 2:3. Compositions having the preferred concentrations are especially advantageous for coating paper stock.

The new coating composition is preferably applied to a suitable base material prior to application of the sensitizing composition, although in some cases it may be desirable to include one or more of the ingredients of the sensitizing composition in the coating composition for concurrent application therewith.

The application to a base material is carried out in any convenient manner, such as by brush coating, roller coating or spraying. Examples of suitable base materials are absorbent materails such as various types of paper, inclding opaque and transparent rag and sulfite stocks, card stock, opaque and transparent cloth, asbestos, plastic-impregnated glass fibers, plaster and porous stone. The coating composition is applied to raw paper stock at a rate of about 1 gallon to about 400 square yards of paper, while more or less absorbent bases require correspondingly more or less composition. After coating, the solvent is evaporated from the wet-coated base, as by heat drying, to produce a base having a firmly adhering coat of intimately mixed silica and resin.

The dry, precoated base is then coated or impregnated with a one or two-component diazotype sensitizing composition suitable for the intended purpose and mode of operation. Illustrative of the diazotype compositions which may be used are those described in U. S. Patent No. 2,598,453. The sensitizing compositions include one or more dye components, one of which is a light-sensitive diazo compound, in aqueous medium containing appropriate additives including a stabilizing agent. A composition is applied to the outer surface of the silica-resin coat in a manner similar to the application of the precoats according to methods well known in the art. Thereafter, the wet product is dried, to produce a diazotype photoprinting material which includes a silica-resin coated base having a light-sensitive layer thereon containing a light-sensitive diazo compound. Referring to the drawing, the light-sensitive layer 5 extends into the silica-resin coat 2, somewhat owing to the porosity of the latter. This penetration is, however, considerably less than where no precoat is applied, and the light-sensitive layer may be considered as being, effectively, on the outer surface 4 of the coat 2.

In using the new photoprinting materials prepared as described, it has been found that the results obtained are superior to those obtained employing photoprinting materials prepared by coating a base with a dispersion of either of the principal ingredients of the new composition alone, even when the concentration of the ingredient used alone exceeds the combined concentration of the ingredients in the new compositions. Not only are the previously referred to disadvantages overcome, but photoprints prepared from the new materials are denser, brighter, and sharper than before.

Illustrative of the improved results obtained in accordance with the invention are the results of the preparation of sepia line direct process intermediate (transition) prints on 100% rag, light weight transparent papers. A marked improvement in density is not obtained until the concentration of colloidal silica used alone in an aqueous precoat dispersion approaches 10%, at which point chalking occurs and there is considerable opacifying action caused by the silica particles being deposited on the surface of the transparent paper. If a colloidal polymerized resin is used alone in an aqueous precoat dispersion, a marked improvement in density is not obtained until the concentration of resin approaches 10%, at which point the resin layer tends to become lumpy and sticky, and an uneven distribution of diazotype sensitizing solution subsequently occurs. On the other hand, if a precoat is employed prior to the application of a sepia line direct process solution to 100% rag, light weight transparent paper, comprising an aqueous dispersion of 5% colloidal silica and 5% colloidal polymerized resin, then an improvement in density is obtained which is greater than when each ingredient is used separately as a precoat, and this without any of the disadvantages that occur when the precoating ingredients are used separately.

The following examples are given to illustrate the invention but it will be understood that the invention is not restricted to the specific materials or proportions set forth.

*Example 1*

A water suspension containing 2% by weight of colloidal silica and 3% by weight of colloidal polystyrene was prepared by dispersing a silica powder (Santocel CX, manufactured by Monsanto Chemical Co.) in water, mixing the dispersion with a polystyrene emulsion (Koppers Polystyrene Emulsion M), in the solids ratio of 2 parts by weight of the former to 3 parts of the latter, and diluting with water.

An all-sulfite, 20½ lb. base paper stock was roller coated with the suspension, at a rate of application of 1000 cc. of suspension per 100 yards of 36 inch width paper. The paper was dried and then impregnated with a two-component diazotype blue line sensitizing composition consisting of the following ingredients in the relative proportions indicated:

100 cc. of water
8 g. of citric acid
5 g. of zinc chloride
5 g. of thiourea
2.4 g. of p-diazo-N,N-diethyl-aniline-zinc chloride double salt
3.0 g. of 2,3-dihydroxy-napththalene-6-sulfonic acid After drying, the precoated sensitized paper was exposed to light under a photographic transparency, and the exposed sheet was developed by treatment with ammonia vapor. A dense bright blue print on a clean white background was obtained. The coloration was much brighter and fuller, and the lines more sharply defined than in the case of similar prints made with sensitized papers containing the same sensitizing ingredients, but either not precoated, or precoated with a 4% colloidal silica suspension containing no resin or a 6% polystyrene resin emulsion containing no silica. Also, none of the defects often found in colloidal silica precoated papers or in colloidal polystyrene precoated papers were present.

*Example 2*

An all-sufite, 20½ lb. base paper stock was precoated with the same suspension and in the same manner as described in Example 1. The paper was dried and then sensitized with a diazotype sensitizing composition similar to that of Example 1 and in the same manner except that 2.0 grams of the coupler m-di-ethyl-amino-phenol was substituted for the 2,3-dihydroxy-naphthalene-6-sulfonic acid coupler.

The resulting paper, when exposed to light under a photographic transparency and developed with ammonia, yielded a dense bright maroon print on a clean white background. Again, the coloration was much brighter and fuller, and the lines more sharply defined than in the cases of comparable prints containing the same sensitizing ingredients but either not precoated, or precoated with 4% colloidal silica alone or 6% colloidal polystyrene resin alone. None of the defects of colloidal silica precoated papers or of colloidal polystyrene precoated papers were present.

*Example 3*

A 100% rag, 14 lb. transparent base paper stock was precoated with a water suspension containing 5% by weight of colloidal silica and 5% by weight of colloidal polystyrene resin, at a rate of application of 1000 cc. per 100 yards of 36 inch width paper. The paper was dried and then impregnated with a two-component diazotype sepia line sensitizing composition containing the following ingredients in the relative proportions indicated:

100 cc. of water
5 g. of citric acid
2 g. of boric acid
5 cc. of glycerol
5 g. of zinc chloride
5 g. of thiourea
4 g. of p-diazo-N-hydroxyethyl-m-methyl-aniline-zinc chloride double salt
4 g. of resorcinol After drying, the precoated sensitized paper was exposed to light under a photographic transparency, and the exposed sheet developed by exposure to ammonia vapor. A dense sepia colored dye image was obtained on a clear transparent background. The image thus formed is highly absorptive of ultraviolet light and may be employed as a pattern for producing additional prints on diazotype papers by exposure to ultraviolet light and subsequent development with ammonia vapor. The coloration was much darker and fuller, and the lines were more sharply defined than in the cases of similar prints made from transparent papers sensitized with the same ingredients, but either not precoated, or precoated with 10% colloidal silica alone or 10% colloidal polystyrene resin alone. None of the defects of colloidal silica precoated papers or of colloidal polystyrene precoated papers were present.

*Example 4*

A 22 lb., 25% rag content base paper stock was precoated with a water suspension containing 3% by weight of colloidal silica and 4% by weight of colloidal polystyrene, at a rate of application of 1000 cc. per 100 yards of 36 inch width paper. The paper was dried and then impregnated with a one-component diazotype sensitizing composition containing the following ingredients in the relative proportions indicated:

100 cc. of water
1 g. of citric acid
2.2 g. of napthalene-2,3,6-tri-sulfonic acid
2.2 g. of diazo-N,N-ethyl-benzyl-aniline-zinc chloride double salt After drying, the precoated sensitized paper was exposed to light under a photographic transparency, and the exposed sheet was developed by treatment with an aqueous black line developing solution of the following composition:

100 cc. of water
8 g. of sodium thiosulfate
2 g. of thiourea
2 g. of sodium carbonate
0.6 g. of phloroglucinol
0.5 g. of resorcinol
0.1 g. of sodium-isopropyl-naphthalene-sulfonate After drying, a dense jet black image on a clean white background was obtained. The black color was much more brilliant, and the lines were more sharply defined, than in the cases of similar prints made with sensitized paper containing the same sensitizing ingredients specified above, but either not precoated, or precoated with a 6% colloidal silica suspension or an 8% colloidal polystyrene emulsion. None of the defects of colloidal silica precoated papers or of colloidal polystyrene precoated papers were present.

A mill-roll run of raw paper stock treated with a mixed precoat suspension employed in accordance with the present invention shows that it absorbs about 1000 cc. of the mixed precoat suspension per 100 yards of 36-inch paper when run at a coating speed of about 1400 to 2000 yards per hour. This amounts to 10 cc. per square yard of paper. Using a 2% colloidal silica and 3% colloidal polystyrene mixture the total solids content deposited on the surface of the paper is about 0.5 gram per square yard. When a 5% colloidal silica and 5% colloidal polystyrene mixture is employed, about 1.0 gram per square yard is deposited on the paper.

In the preferred practice of the invention, the colloidal silica particles are larger (preferably around 2 microns) than the colloidal polystyrene (which is preferably around 0.1 micron). While the invention is not limited to any theory, it is believed that since the colloidal silica particles are irregular in shape and porous, more or less like sponges, and the colloidal polystyrene particles are smoothly spherical, that the smaller polystyrene particles fill in the spaces between the larger silica particles, and since the layer is very thin, a smooth absorbent surface is built up upon and fills the openings between the comparatively rough mat of wood fiber particles comprising the surface of the paper sheet. The irregular surfaces of the silica particles are minimized by the presence of the spherical polystyrene particles, yet the absorbent characteristics are relatively unimpaired. Likewise, the presence of the inorganic silica particles prevents the formation of a continuous resinous film, and therefore reduces the stickiness and tackiness characteristic of purely organic precoat films. In any event, the combined inorganic and organic precoat produces a better product than either precoat alone.

What is claimed is:

1. The method for preparing a diazotype photoprinting material which comprises coating an absorbent base with an aqueous dispersion of finely divided silica having a particle size of colloidal to about 5 microns and of a finely divided substantially water-insoluble resin having a maximum particle size of about 0.1 micron and selected from the group consisting of polystyrene resins, polyacrylic resins, and polyvinyl resins, drying the resulting wet-coated base, coating the resulting dry coated base with a light-sensitive diazo compound in aqueous medium, and drying the resulting product.

2. The method for preparing a diazotype photoprinting material which comprises coating an absorbent base with an aqueous dispersion of finely divided silica having a particle size within a range of about 0.5–5 microns and of finely divided polystyrene having a maximum particle size of about 0.1 micron, drying the resulting wet-coated base, coating the resulting dry coated base with a light-sensitive diazo compound in aqueous medium, and drying the resulting product.

3. The method for preparing a diazotype photoprinting material which comprises coating paper with an aqueous dispersion containing about 1 to 10% by weight of finely divided silica having a particle size within a range of about 0.5–5 microns and containing about 1 to 10% by weight of finely divided polystyrene having a lesser particle size, the relative weight proportions of said silica and said polystyrene being within the range of 3:2 to 2:3, drying the resulting wet-coated paper, coating the resulting dry coated paper with a light-sensitive diazo compound in aqueous medium, and drying the resulting product.

4. A diazotype photoprinting material which comprises an absorbent base, a dried coat on said base of an aqueous dispersion of an intimate mixture of finely divided silica having a particle size of colloidal to about 5 microns and a finely divided substantially water-insoluble resin having a maximum particle size of about 0.1 micron and selected from the group consisting of polystyrene resins, polyacrylic resins, and polyvinyl resins and a light-sensitive layer on said coated base containing a light-sensitive diazo compound.

5. A diazotype photoprinting material which comprises an absorbent base, a dried coat on said base of an intimate mixture of finely divided silica having a particle size of about 0.5–5 microns and finely divided polystyrene having a lesser particle size, the relative weight proportions of said silica and said polystyrene being within the range of 3:2 to 2:3, and a light-sensitive layer on said coated base containing a light-sensitive diazo compound.

6. The method for preparing a diazotype photoprinting material which comprises coating an absorbent base with an aqueous dispersion of finely divided silica having a particle size of colloidal to about 5 microns and of finely divided polystyrene having a maximum particle size of about 0.1 micron, drying the resulting wet-coated base, coating the resulting dry coated base with a light-sensitive diazo compound in aqueous medium, and drying the resulting product.

7. The method for preparing a diazotype photoprinting material which comprises coating paper with an aqueous dispersion containing about 1 to 10% by weight of finely divided silica having a particle size of colloidal to about 5 microns and containing about 1 to 10% by weight of finely divided polystyrene having a maximum particle size of about 0.1 micron, drying the resulting wet-coated paper, coating the resulting dry coated paper with a light-sensitive diazo compound in aqueous medium, and drying the resulting product.

8. A diazotype photoprinting material which comprises an absorbent base, a dried coat on said base of an intimate mixture of finely divided silica having a particle size of colloidal to about 5 microns and finely divided polystyrene having a maximum particle size of about 0.1 micron, and a light-sensitive layer on said coated base containing a light-sensitive diazo compound.

9. A diazotype photoprinting material which comprises paper, a dried coat on said paper of an intimate mixture of finely divided silica having a particle size of colloidal to about 5 microns and finely divided polystyrene having a maximum particle size of about 0.1 micron, and a light-sensitive layer on said coated paper containing a light-sensitive diazo compound.

References Cited in the file of this patent

UNITED STATES PATENTS

| | | |
|---|---|---|
| 1,989,879 | Murck | Feb. 5, 1935 |
| 2,311,233 | Jaenicke et al. | Feb. 16, 1943 |
| 2,322,037 | Lindquist | June 15, 1943 |
| 2,399,981 | Britt | May 7, 1946 |
| 2,496,196 | Botkin | Jan. 31, 1950 |
| 2,505,353 | Fisk | Apr. 25, 1950 |
| 2,597,872 | Iler | May 27, 1952 |
| 2,613,149 | Unkauf | Oct. 7, 1952 |
| 2,626,867 | Webster | Jan. 27, 1953 |
| 2,662,013 | Sulich et al. | Dec. 8, 1953 |

FOREIGN PATENTS

| | | |
|---|---|---|
| 562,666 | Great Britain | July 11, 1944 |